（12）United States Patent
Pashayev et al.

(10) Patent No.: US 10,737,770 B2
(45) Date of Patent: Aug. 11, 2020

(54) METHOD AND DEVICE FOR INCREASING THE STABILITY AND MANEUVERABILITY OF UNMANNED AERIAL VEHICLES (UAV) USING A GYROSCOPIC EFFECT

(71) Applicants: Arif Mir Jalal ogly Pashayev, Baku (AZ); Toghrul Isa ogly Karimli, Baku (AZ)

(72) Inventors: Arif Mir Jalal ogly Pashayev, Baku (AZ); Toghrul Isa ogly Karimli, Baku (AZ)

( * ) Notice: Subject to any disclaimer, the term of this patent is extended or adjusted under 35 U.S.C. 154(b) by 29 days.

(21) Appl. No.: 15/551,037

(22) PCT Filed: Feb. 23, 2016

(86) PCT No.: PCT/AZ2016/000003
§ 371 (c)(1),
(2) Date: Aug. 15, 2017

(87) PCT Pub. No.: WO2017/020097
PCT Pub. Date: Feb. 9, 2017

(65) Prior Publication Data
US 2018/0029695 A1  Feb. 1, 2018

(30) Foreign Application Priority Data
Feb. 23, 2015  (AZ) .................. a 2015 0022

(51) Int. Cl.
*B64C 17/06*    (2006.01)
*B64C 39/02*    (2006.01)

(52) U.S. Cl.
CPC ............ *B64C 17/06* (2013.01); *B64C 39/024* (2013.01); *B64C 2201/104* (2013.01)

(58) Field of Classification Search
CPC .. B64C 17/06; B64C 39/024; B64C 2201/104
See application file for complete search history.

(56) References Cited

U.S. PATENT DOCUMENTS

| 5,437,420 A * | 8/1995 | Rosen | B64G 1/285 244/165 |
| 5,628,267 A * | 5/1997 | Hoshio | B63B 39/04 114/122 |

(Continued)

FOREIGN PATENT DOCUMENTS

| RU | 2084826 C1 | 7/1997 |
| SU | 355494 A1 | 3/1973 |

*Primary Examiner* — Zakaria Elahmadi
(74) *Attorney, Agent, or Firm* — John Alumit

(57) ABSTRACT

Proposed method and device could be applied as controlling system facilitating the maneuverability and stabilization parameters of UAV, as well as various flight objects and small satellites. The aim of the invention is to reduce the occurrences of imbalances of UAV in strong wind or atmospheric turbulence situations and simultaneously rehabilitation of maneuverability and stabilization parameters without increasing flight speed.

Figure 1:
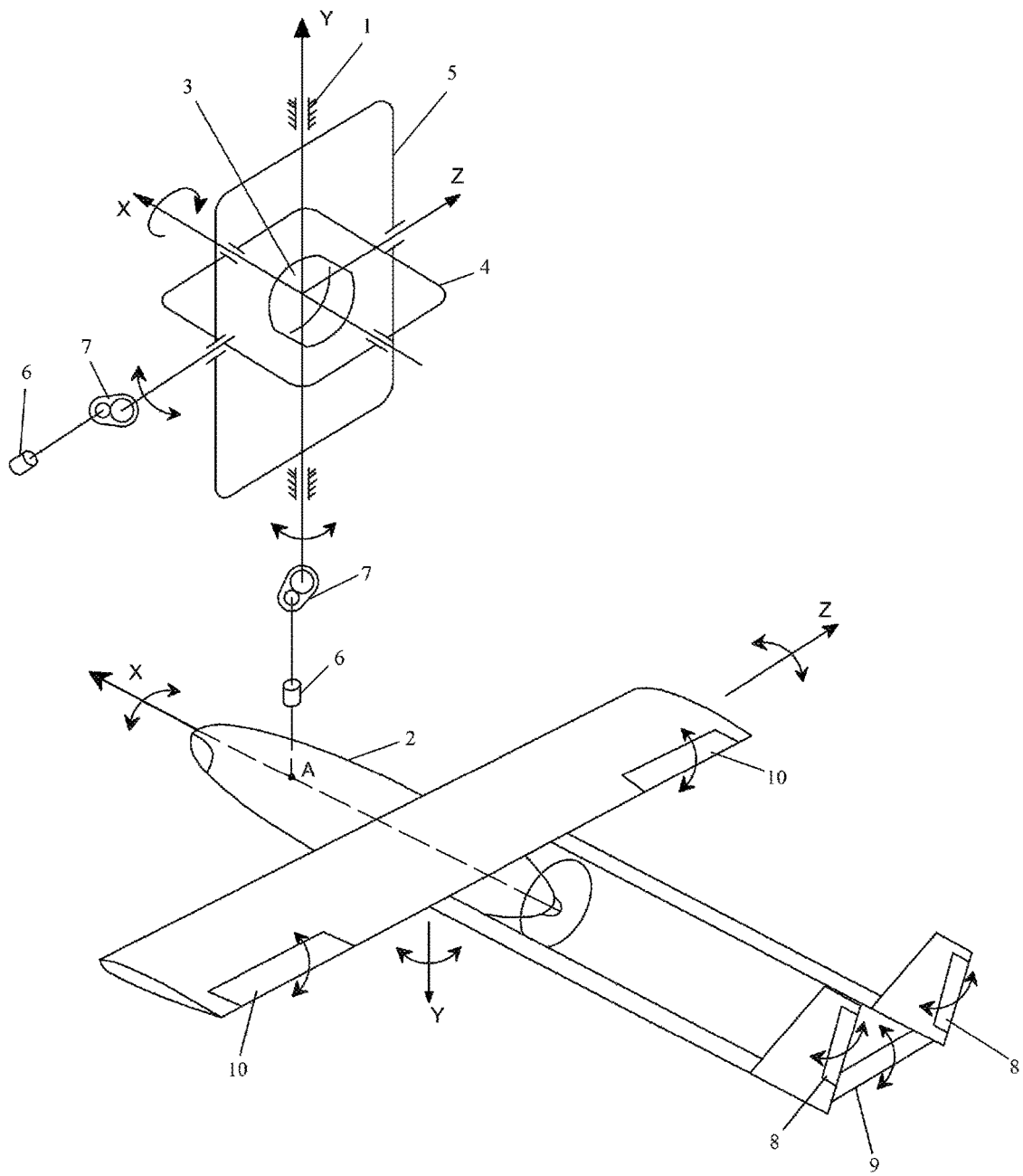

Thus, in order to upgrade the above mentioned parameters of UAV along with the gyroscopic momentum compensation it's necessary to increasing of the kinetic moment by means of gyroscope.

This is achieved by installing the gyroscopes oppose to the propeller taking into account the gravity center of UAV (with rear-mounted propeller gyroscope should be installed in front sector), the direction of rotation of the gyro rotor is directed against the rotation of the propeller (the axis of the gyro rotor and propeller are in straight line); availing high kinetic momentum the devise becomes less subjected to the effects of the wind and turbulence; changing of the flight trajectory performed by moving axis of the gyroscope (stabilization and moments motors) and reductor, that fixed on moving shaft of the rotary frame, and the gyroscope is installed in a device to perform coincidence of the gyroscopic moments with the direction of the rotation of UAV. Coincidence of the directions of gyroscopic moments with (Continued)

the moments of the elevator and rudder increases the UAVs maneuverability. Stabilization and modification of the angular position of the UAV relative to the longitudinal roll axis is performed by increasing or decreasing of rotations of the gyro rotor with adjustable inertial moment.

2 Claims, 2 Drawing Sheets

(56) References Cited

U.S. PATENT DOCUMENTS

| | | | | |
|---|---|---|---|---|
| 5,890,441 | A * | 4/1999 | Swinson | B64C 29/0025 244/12.1 |
| 6,039,290 | A * | 3/2000 | Wie | B25J 9/1607 244/164 |
| 6,419,190 | B1 * | 7/2002 | Nguegang | B05C 1/08 118/256 |
| 6,729,580 | B2 * | 5/2004 | Shultz | B64C 17/06 244/79 |
| 6,973,847 | B2 * | 12/2005 | Adams | B63B 39/04 114/121 |
| 7,044,422 | B2 * | 5/2006 | Bostan | B64C 17/06 244/12.1 |
| 7,051,608 | B2 | 5/2006 | Guerrero | |
| 7,240,630 | B2 * | 7/2007 | Akers | B63B 39/04 114/122 |
| 8,561,944 | B2 * | 10/2013 | McClure | B64C 17/06 244/79 |
| 9,501,061 | B2 * | 11/2016 | Canoy | G05D 1/0816 |
| 9,518,821 | B2 * | 12/2016 | Malay | G01C 9/005 |
| 2012/0091284 | A1 * | 4/2012 | Goodarzi | B64C 39/024 244/23 A |
| 2014/0339372 | A1 * | 11/2014 | Dekel | B64C 29/0033 244/7 R |
| 2015/0321754 | A1 * | 11/2015 | Uebori | B64C 39/024 244/17.23 |
| 2016/0137298 | A1 * | 5/2016 | Youngblood | B64C 39/024 244/17.23 |
| 2016/0251077 | A1 * | 9/2016 | Amino | B64C 27/10 244/17.23 |
| 2016/0325829 | A1 * | 11/2016 | Ahn | B64C 39/024 |
| 2017/0233070 | A1 * | 8/2017 | Starace | G05D 1/0088 244/7 B |
| 2018/0072404 | A1 * | 3/2018 | Prager | B66D 1/485 |
| 2018/0099744 | A1 * | 4/2018 | Bockem | B64C 39/024 |

* cited by examiner

METHOD AND DEVICE FOR INCREASING THE STABILITY AND MANEUVERABILITY OF UNMANNED AERIAL VEHICLES (UAV) USING A GYROSCOPIC EFFECT

The submitted invention (method and device) is related to control systems and designed to increase stability and maneuverability of unmanned aerial vehicles (UAV), and may be used to control and correct various dynamic objects, including small satellites.

All airplanes in space maneuver control surfaces due to a creation of aerodynamic moments. To ensure a maximum control moment, the control surfaces are positioned, if possible, at a maximum distance from the airplane center of mass. Control surfaces (keel, stabilizer, rudder and elevator, ailerons, slats, spoilers) perform an angular stabilization of aircrafts and create aerodynamic moments. Aircrafts of certain designs can maneuver along two axis of one control surface, e.g. an elevon (a combination of a elevator and ailerons), V-shaped fin rudder (functions of a rudder and elevator), and differential stabilizer [1]. When designing UAV and other aircrafts, the main challenges are flight safety and fast maneuverability, stability and controls.

Depending on technical specifications, to increase UAV maneuverability, there are several known designs based on aerodynamic methods [2].

Many UAV designs consist of an airframe and propulsion (aircraft engine and propeller) with a horizontal takeoff and landing (HTL), propeller engine, creating thrust, are located behind the center of mass. Features that are present in the claimed invention are italicized. If a propeller rotates clockwise, then UAV is affected by an equal in value and opposite in direction left banking moment. If a propeller rotates counter-clockwise, then UAV is affected by an equal in value and opposite in direction right inclining moment of the propeller reaction. At low speed of UAV and fast propeller rotations, the inclining moment of the propeller reaction reaches the maximum value. Furthermore, if the UAV propeller rotates clockwise and installed in front of the center of mass, then, during the right banked turn, a created gyroscopic moment pushes UAV downward, while during the left banked turn, the gyroscopic moment pushes UAV upward. If the propeller is installed at the tail section, the gyroscopic moment pushes UAV in the opposite direction.

If the propeller rotates counter-clockwise and installed in front of the center of mass, then during the right banked turn, the created gyroscopic moment pushes UAV upward, while during the left banked turn, the gyroscopic moment pushes UAV downward. If the propeller is installed at the tail section, the gyroscopic moment pushes UAV in the opposite direction. During a nose-up or nosedive, the gyroscopic moments produce unwanted UAV drifting moments to the left and to the right [1]. When taking off or landing with a side wind, gyroscopic moments of the propeller affect UAV HTL, which push flight trajectories up or down, which could result in a dangerous emergency mode. A deficiency of the known method and device is that a UAV, flying in windy conditions at low speeds, at low and high altitudes (close to practical statical altitude ceiling) do not have sufficient flight stability.

There is a known small-sized aircraft with self-stabilizing aerodynamic surfaces, consisting of a body, aerodynamic surfaces, with capability to rotate relative a rolling axis of the aircraft and tail fins, designed to provide stability to the small aircraft in the trajectory plane and flight control along the ballistic trajectory, based on the aerodynamic method of control [3]. Features that are present in the claimed invention are italicized. A deficiency of this known method and device is its uselessness in UAV application with propeller engines, flying at low speeds at critical modes of stability. At low-speed flights, with turbulent conditions, the effectiveness of aerodynamic surfaces, creating control moments, is of insignificant value. To prevent stalling, caused by the UAV's horizontal position, it is required to increase the flight speed, while not exceeding the allowed speed to avoid excessive overloads.

There is a known gas-dynamic method to control UAV, performing flights at 35-45 km altitude [4]. Attitude control system in large spacecraft (SC) use a gas-dynamic method, which includes a trajectory correction motor and stability micro-motor system, each one consisting of 4 stability motors of the spacecraft in the rolling axis and 4 stability motors in the pitch and yaw channels. Features that are present in the claimed invention are italicized. A deficiency of this known method is its short-time duty and inability to apply it to small-sized UAV HTL. A deficiency of this known device is its many structural elements and mass-dimensional parameters.

There are known Control Momentum Gyroscopes (CMGs), which create gyroscopic moments in stability and attitude control systems of heavy-duty and medium duty spacecraft. CMGs produce control moments in stability and programmed turn modes of spacecraft relative to reference coordinate set [5]. Features that are present in the claimed invention are italicized. A deficiency of this known method is its short-time duty and inability to apply it to small-sized UAV HTL. A deficiency of this known device is its many structural elements and mass-dimensional parameters.

The closest, by its technical nature, to the claimed item (method) is a method of using a gyroscopic moment to control aircraft (transport vehicle) [6]. A creation of the gyroscopic moment, which is the basis of this method, is produced by several gyroscopes. A gyroscopic moment occurs when a force acts upon the gyroscope axis that tends to set it in motion, i.e. creating a rotating moment relative to the center of suspension. Due to this rotating moment, Coriolis forces occur, therefore the end of the gyroscope axis will move not in the direction of the force, but in the direction perpendicular to this force and, as a result, the gyroscope will begin to rotate around the axis with constant angular velocity. Features that are present in the claimed invention are italicized. A deficiency of this known method is a failure to take into account a direction of propeller rotation of small UAV HTL, and, as a result, failure to compensate the reaction moment and the gyroscopic moment of the propeller during UAV evolutions.

The closest, by its technical nature, to the claimed item (device) is an aircraft (transport vehicle) control device [6]. The device allows to technically implement the method to use a gyroscopic moment to control an aircraft (transport vehicle) and consists of a housing, central axis with beams, gyroscopes with fastener systems to beams. The fastener system contains a frame, fastener, incline and turn systems of the frame, and a gyroscope holder. The housing and central axis are fastened through the additional moment system. Features that are present in the claimed invention are italicized. A presence of an additional second gyroscope to neutralize occurring inertial and reaction moments (reverse action moment) when rotating a gyroscope (rotor) or its deceleration, relatively large mass-dimensional parameters, excessive start-up and braking time of gyroscopes due to large moments of inertial of gyroscopes is a deficiency of the device.

The task of the proposed invention is to reduce UAV sensitivity to wind and turbulence without increasing the flight speed, as well as a simultaneous increase in stability and maneuverability.

Technical specifications are achieved by installing a gyroscope relative to the UAV center of gravity opposite of the propeller (if the propeller is in the tail section, the gyroscope is installed in the front section), the gyroscope rotor rotation is directed against the propeller rotation (the gyroscope rotor and propeller rotational axis are located on one line); a device with a high kinetic moment becomes less sensitive to wind and turbulence, and flight stability increases; to change the flight trajectory, the gyroscope rotor rotational axis turns, assisted by electric motors (stability and moment motors) and gears, located on rotational axis of swivel frames, in such a way so the directions of created gyroscopic moments would correspond to the direction of UAV turn. Corresponding directions of gyroscopic moments and rudder and elevator moments ensure an increase in maneuverability and a reduction of transition mode time while piloting UAV. The stabilization and the change in angular position of UAV bank around the rolling axis is performed by increasing or decreasing the gyroscope rotor's rotational speed (reaction moment) with adjustable inertial moment.

The advantages of the method and device to increase stability and maneuverability of UAV by gyroscopic effects are the following:
1. An increase in flight mode range, restricted by low efficiency of aerodynamic rudders, at low UAV speeds, in windy and turbulent conditions, close to service ceiling;
2. Increase in UAV maneuvering speed;
3. Reduction of sensitivity to wind effects and increase in movement trajectory stability (required for aerial photography), reduction of amplitude and time of the UAV piloting transient mode, which improves flight fuel economy.

The method to increase stability and maneuverability of UAV by gyroscopic effects, utilizing a gyroscopic moment, is shown on the drawing (FIG. 1). The drawing consists of the gyroscope housing, body 2, gyroscope rotor 3, gyroscope inner frame 4, gyroscope outer frame 5, electric motors 6, gears 7, rudder 8 and elevator 9, which create aerodynamic moments, and ailerons 10. Additionally created gyroscopic moments supplement aerodynamic moments. Gyroscope housing 1 is rigidly connected at point A of the body 2 on one line with the propeller axis. Opposite of the propeller, a fast-rotating gyroscope rotor 3 is installed within the sliding (up and down) inner frame 4. The inner frame is installed within the outer frame 5. This frame can turn left or right and it is installed within the gyroscope housing. The electric motor 6 (stabilization and moment motor) and gear 7, turning the inner frame rotational axis, are installed on the outer frame. For example, if the gyroscope rotor rotates clockwise (opposite of the propeller rotation direction), then when the inner frame moves up relative to the horizon (if the gyroscopic outer frame is stopped) with the help of the electric motor and gear, the created gyroscopic moment turns UAV's heading to the right, and when the inner frame moves down relative to the horizon, turns UAV's heading to the left, which improves the rudder 8 effectiveness, especially at low flight speeds and in critical stability modes. The electric motor 6 (stabilization and moment motor), installed in the gyroscope housing, gear 7, and rotating inner frame rotational axis provide UAV stabilization and pitch control moment. For example, if the gyroscope rotor rotates clockwise (opposite of the propeller rotation direction), then when the outer frame moves left (if the gyroscope inner frame is stopped) with the help of the electric motor and gear, the created gyroscopic moment moves UAV upward, and when the outer frame moves right, UAV moves downward, which improves the elevator 9 effectiveness, especially at low flight speeds and in critical stability modes. If rotational directions of the rotor and propeller are opposite of each other, and gyroscope rotor and propeller inertial moments are equal, and also aileron positions are neutral, then UAV does not bank. To stabilize UAV flight trajectory along the roll axis and create banking moment, UAV will bank to the left due to an increase (clockwise) in the rotating speed of the gyroscope rotor with the adjustable inertial moment, and UAV will bank to the right due to a reduction in the rotating speed of the rotor. Thus, an improvement in efficiency in ailerons 10 is achieved, especially at low flight speeds and in critical stability modes.

Figure 2:
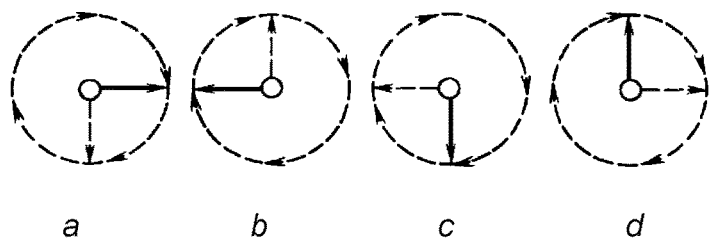

Drawing (FIG. 2) shows directions of created controlling gyroscopic moments (if propeller is installed at the tail section, while the gyroscope is installed at the nose section) with a change in the gyroscope rotor rotational plane. When the gyroscope rotor (FIG. 2a) turns to the right, the gyroscopic moment creates a UAV pitch-down moment. When the gyroscope rotor (FIG. 2b) turns to the left, the gyroscopic moment creates a UAV pitch-up moment. When the gyroscope rotor (FIG. 2c) moves down, the gyroscopic moment banks UAV to the left. When the gyroscopic rotor (FIG. 2d) moves up, the gyroscopic moment turns UAV's heading to the right. These controlling gyroscopic moments are added to aerodynamic moments of the rudder 8 and elevator 9 and increase the UAV maneuverability.

Figure 3:
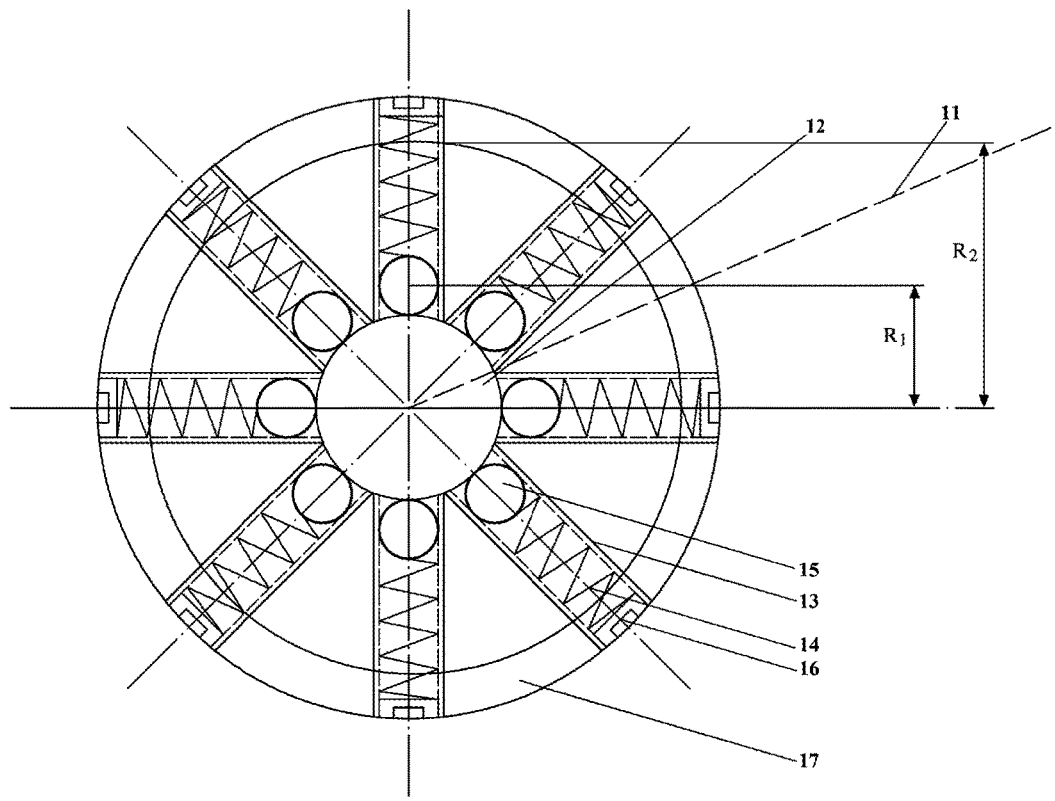

Drawing (FIG. 3) shows the device to increase the UAV stability and maneuverability using gyroscopic effect, based on a gyroscope with adjustable inertial moment of the rotor.

The device consists of the axis 11, inner disk 12, guiding tubes 13, spring 14, heavy balls 15, adjusting screws 16 and outer disk 17. The rotor, installed on the axis, consists of the inner disk 12, guiding tubes 13, wherein springs 14 are located, which provide an increase in the rotor responsiveness, moving depending on the controlled number of axis rotations, moving balls 15, and adjusting screws 16, designed to balance the rotor. Guiding tubes are fastened along the radius to the outer disk 17. The rotor axis rotates with the help of a motor with adjustable number of revolutions (not shown on the drawing). Adjusting screws can also set the rotor's inertial moment. When starting the gyroscope rotor with adjustable inertial moment, due to the positioning of heavy balls of mass m near radius $R_1$, the minimum value of the inertial moment J ($J=mR_1^2$) helps to increase the rotor acceleration, i.e. start-up time of the gyroscope rotor is reduced. When the gyroscope rotor increases its revolutions due to centrifugal forces, heavy balls, made from tantalum or heavy steel alloys, overcoming the spring elastic force, move to the outer disk, increasing the rotor inertial moment. At the same time, along with an increase in rotor revolutions, an increase in mass within the outer disk increases the acceleration in the rotor reaction moment. With an increase in inertial moment, depending on rotor revolutions, its kinetic moment is increased, so a large controlling gyroscopic moment of the gyroscope rotor (created by electric motors 6 and gears 7) can be obtained. At maximum value of rotor revolutions, due to balls positioning near the outer disk, the controlling gyroscopic moment and the rotor's reverse reaction moment has a maximum value ($J=mR_2^2$), which is important for low speed flights and critical stability modes of UAV [7]. With decrease in rotor revolutions, the elastic force, prevailing over the centrifugal force, helps to move balls toward the rotor's center. Thus, the rotor inertial moment is reduced, which results in a rapid braking of the rotor. Rapid acceleration and rapid deceleration of the rotor help control the rotor reaction moment, counteractive in direction, which is used to control UAV banking around the axis X. Thus, an increase in stability and stabilization of the flight trajectory, as well as quick UAV maneuvering relative to axis X, Y, and Z, is performed by one gyroscopic device with adjustable inertial moment.

REFERENCES

1. Principles of Flight. JAA ATPL. Theoretical knowledge manual. Oxford Aviation, Frankfurt, Germany, 2001. p. 366, p. 561.
2. Unmanned aircraft systems. UAVS design, development and deployment. Reg Austin. 2010 John Wiley & Sons Ltd, United Kingdom. p. 34-37, FIG. 3.7.
3. Patent: RU 2489313. MPK: B64C 5/00, F42B 10/62. A. B. Borisenko, S. M. Lazarenkov, A. V. Nikitenko. Compact aircraft with self-stabilizing aerodynamic surfaces. Oct. 8, 2013, Iss. No 22.
4. A. A. Lebedev, L. S. Chernobrovkin. UAV flight dynamics. College textbook. M. Mechanical engineering, 1973. p. 44-47.
5. Spacecraft on-board control systems. Textbook. A. G. Brovkin, B. G. Burdygov, S. V. Gordiyko, et al. Edited by A. S. Syrov. M. MAI, 2010. p. 80-98.
6. Patent: RU 2495789. MPK: B64C 17/06. A. A. Tarasov. A method to utilize a gyroscopic moment to control aircraft (transport vehicle) and aircraft controlling device. 20 Oct. 2013, Iss. No 29.
7. Physics course. College textbook. T. I. Trofimova. 11th edition. M. Academy. 2006. p. 34-35.

What is claimed:

1. A method to increase the stability and maneuverability of unmanned aerial vehicles, also known as UAV, using a gyroscopic effect, which uses a gyroscopic moment, consisting of a gyroscope housing, a body, a gyroscope rotor, a gyroscope inner frame, a gyroscope outer frame, electric motors, gears, a rudder, and an elevator, which create aerodynamic moments, and ailerons, comprising the steps of:

rigidly connecting the gyroscope housing to a point on the body on a line along a propeller axis of the UAV;
installing the gyroscope rotor opposite the propeller within the gyroscope inner frame;
installing the gyroscope inner frame within the gyroscope outer frame, which is in turn installed within the gyroscope housing; and
installing the electric motor and gears on the gyroscope outer frame;
WHEREIN, if the gyroscope rotor rotates clockwise, that is, opposite a propeller rotation direction, the gyroscope inner frame moves up with the help of the electric motor and gears, creating a gyroscopic moment so that the UAV turns to right, and when the gyroscopic inner frame moves down, the UAV turns to the left;
WHEREIN, if the gyroscope rotor rotates clockwise, that is, opposite a propeller rotation direction, the outer frame moves left with the help of the electric motor and gears, creating a gyroscopic moment so that the UAV's pitch moves upward, and when the outer frame moves right, the UAV's pitch moves downward;
WHEREIN, if the rotational directions of the rotor and propeller are opposite of each other, and the gyroscope rotor and propeller inertial moments are equal, and the aileron positions are neutral, the UAV does not bank;
WHEREIN the stabilization and control of the UAV is performed by a single gyroscope, whose gyroscope rotor rotates oppose the aircraft propeller direction, and
WHEREIN stabilization and control of the UAV relative to a rolling axis is performed by creating an additional reaction moment, by increasing and/or decreasing the gyroscope rotor rotation speed with adjustable inertial moment.

2. A device to increase the stability and maneuverability of unmanned aerial vehicles, also known as UAV, using a gyroscopic effect, whose work is applied along with the method in claim 1 and using a gyroscope rotor with adjustable inertial moment, consisting of a disk rotor, differing by having guiding tubes connecting disk end points with rotational axis, moving balls, located within guiding tubes, springs, adjusting screws, installed in the rotor rotation plane, which, in turn, by increasing or decreasing the rotor rotational speed helps to improve the gyroscope responsiveness.

* * * * *